United States Patent [19]

Fongen

[11] Patent Number: 5,688,387

[45] Date of Patent: Nov. 18, 1997

[54] TURBO ELECTROCHEMICAL SYSTEM

[76] Inventor: Sigurd Fongen, Elv. Alnaes vei 24, N-1410 Kolbotn, Norway

[21] Appl. No.: 578,712
[22] PCT Filed: May 4, 1994
[86] PCT No.: PCT/NO94/00083
§ 371 Date: Jan. 2, 1996
§ 102(e) Date: Jan. 2, 1996
[87] PCT Pub. No.: WO94/26956
PCT Pub. Date: Nov. 24, 1994

[30] Foreign Application Priority Data

May 10, 1993 [NO] Norway ............... 931689

[51] Int. Cl.$^6$ ............................. C25B 11/03
[52] U.S. Cl. ............ 204/263; 204/275; 204/283; 204/284
[58] Field of Search ............... 204/284, 283, 204/263, 275

[56] References Cited

U.S. PATENT DOCUMENTS

| | | | |
|---|---|---|---|
| 3,788,967 | 1/1974 | Kawahata | 204/277 |
| 4,248,682 | 2/1981 | Lindstrom et al. | 204/242 |
| 4,319,973 | 3/1982 | Porta | 8/111 |
| 4,345,986 | 8/1982 | Korach | 204/266 |
| 4,627,897 | 12/1986 | Tetzlaff et al. | 205/334 |
| 4,784,735 | 11/1988 | Sorenson | 205/530 |
| 4,909,912 | 3/1990 | Oda | 205/524 |

FOREIGN PATENT DOCUMENTS 026 994 of 0000 European Pat. Off. .
150 018 of 0000 European Pat. Off. .

*Primary Examiner*—John Niebling
*Assistant Examiner*—Brendan Mee
*Attorney, Agent, or Firm*—Kane, Dalsimer, Sullivan, Kurucz, Levy, Eisele and Richard, LLP

[57] ABSTRACT

The apparatus consists of one or more electrolytic cells containing electrodes made out of metal foils perforated with a very large number of microscopic holes, through which electrolyte is sprayed or pumped, creating a large contact area between the electrolyte and the conductive electrode material. The apparatus can be used for the production of bleaching and oxidizing liquids, both "in-line" and "off-line," for de-lignification and/or bleaching of cellulose fibers or other solids in suspension, or for oxidizing of organic compounds in liquids in connection with COD reduction or disinfection. The apparatus can also be used to create electrostatic effects on fines, colloids and chemicals in liquids, and thereby influence surface tensions, transfer of charges, electrokinetics and adsorption.

11 Claims, 4 Drawing Sheets

TURBO ELECTROCHEMICAL SYSTEM

FIELD OF INVENTION

The apparatus has been developed conducting of electrochemical synthesis, for example in an electrolyte containing NaOH and oxygen gas for evolving of nascent oxygen at the anode and hydroxy radicals at the cathode, and which can be applied both for de-lignification and/or bleaching of for example lignin-containing cellulosic material and for oxidation of organic compounds in liquids, in connection with COD-reduction or desinfection.

The apparatus can also be applied for electrostatic treatment of liquids containing fines, colloids and chemicals and thereby influence surface tensions, transfer of charges, electrokinetics and adsorption, for example in connection with flocculation, sedimentation, flotation etc. Other possible fields of application can be as elements in the construction of galvanic cells or fuel cells.

1. Background of the Invention.

Hydroxy radicals, as a product of hydrogen peroxide, $H_2O_2$, dissolved in water, is today used as bleaching agent by so-called "lignin-preserving bleaching" in the pulp and paper industry, i.e. for oxidation and breakdown of preferably chemical bondings in the colouring matters of lignin, or also as an oxidation and disinfection means against water pollution. $H_2O_2$ is today produced "off-line", i.e. outside the process in which the bleaching is taking place, and is added to the process from the outside as a bleaching liquid.

External $H_2O_2$ production is relatively expensive due to separate production equipment, transportation costs and necessary precautions against chemical degradation before use.

Nascent oxygen, O, is today brought about by the use of ozone, and evolves in the moment ozone, $O_3$, is degraded into $O_2+O$ in the medium to be bleached. The production of ozone today is relatively complicated and takes place in separate, external $O_3$-generators, attached to a separate $O_2$-plant.

Common drawbacks by today's electrolytical cells are their capacity limitations due to a relatively small contact area between the electrolyte and the current conducting material of the electrode.

As for electrostatic influence on liquids as mentioned above, there is to our knowledge as per today not established any technology ready for use.

2. Summary of the Invention.

The apparatus is directed to eliminating the above drawbacks and has the following, special features:
- a combined and at the same time electrochemical synthesis in one or more separated electrolysis chambers for for example production of respectively nascent oxygen and hydroxy radicals,
- the electro synthesis is taking place "off-line" or "inn-line" in relation to the liquid or suspension to be treated,
- highefficient- and selfcleaning electrodes in the form of thin, perforated metal foils onto which the electrolyte is being sprayed or pumped through,
- strong agitation and mixing of bleaching liquid and the substances to be de-lignified, bleached or oxidized in connection with desinfection or COD-reduction in or in direct connection with the electrolysis chamber,
- a very small distance between relatively large electrode areas promotes conductivity and electrochemical efficiency,
- the electrolyte is being pressed through a relatively large number of holes in the electrodes (for example 200 million holes per square meter), creating a very large contact area between the metal in the electrodes and the process liquid, and which promotes the electrolysis correspondingly,
- possibly repeated treatments of the liquid by circulating the electrolyte in a circuit repeatedly through the electrodes.

IN THE DRAWINGS

Figure 5:
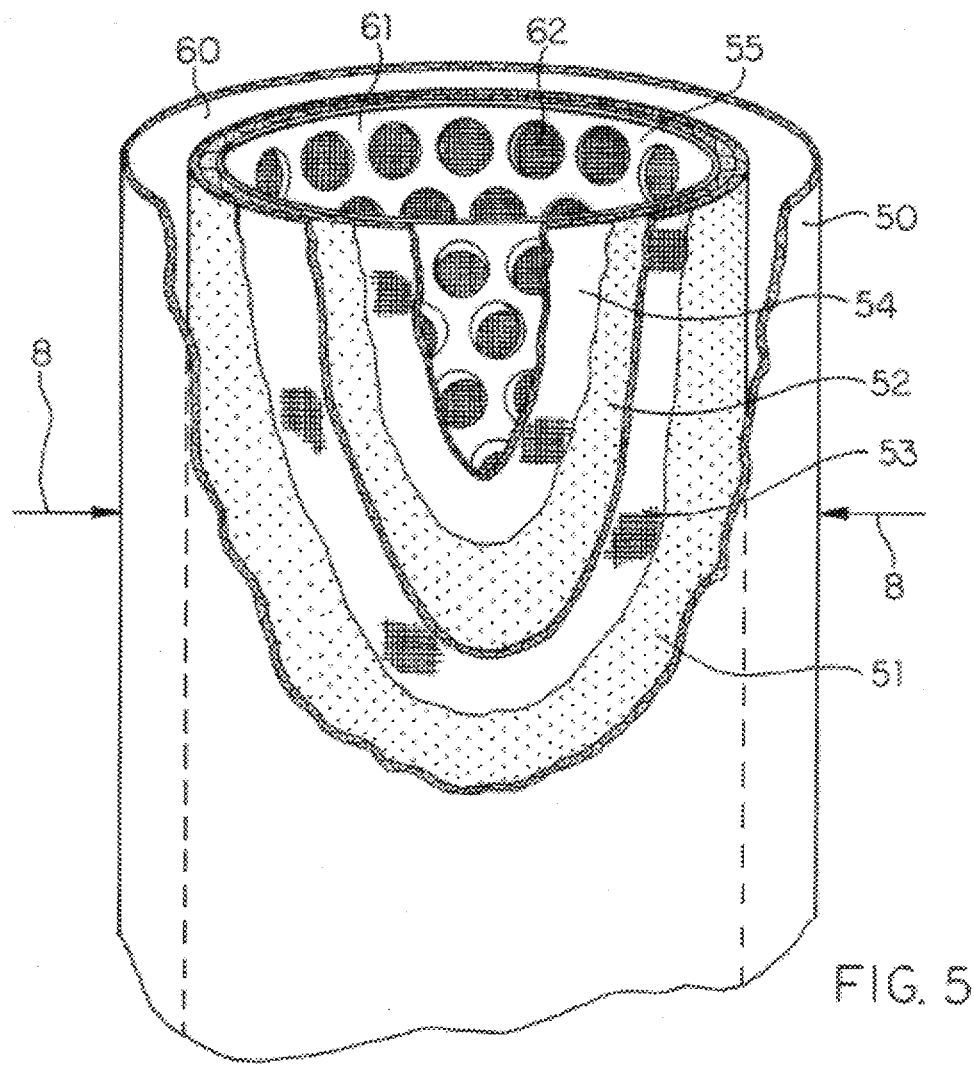

FIG. 5 clarifies the construction of the cylindrically formed electrodes.

Figure 6:
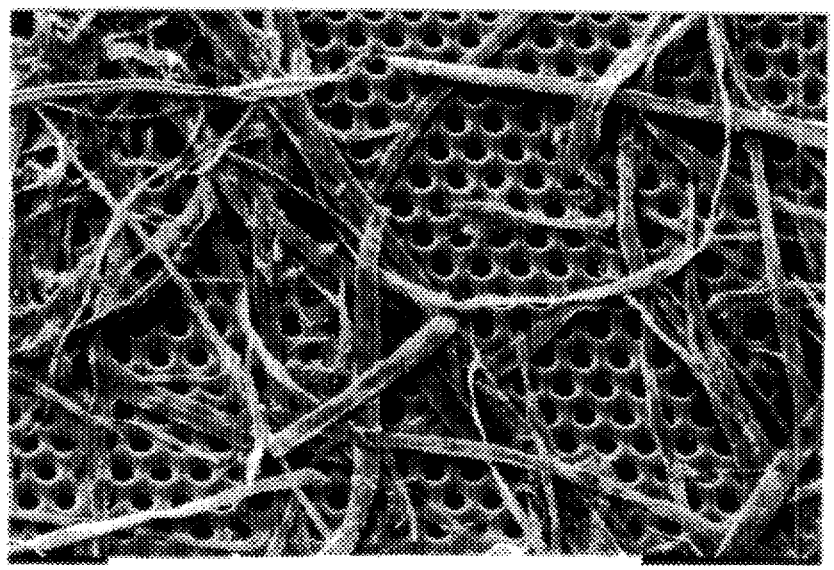

FIG. 6 is a picture of the perforated metal foil electrode, photographed with cellulose fibres at the surface.

DESCRIPTION OF THE PREFERRED EMBODIMENT

Figure 1:
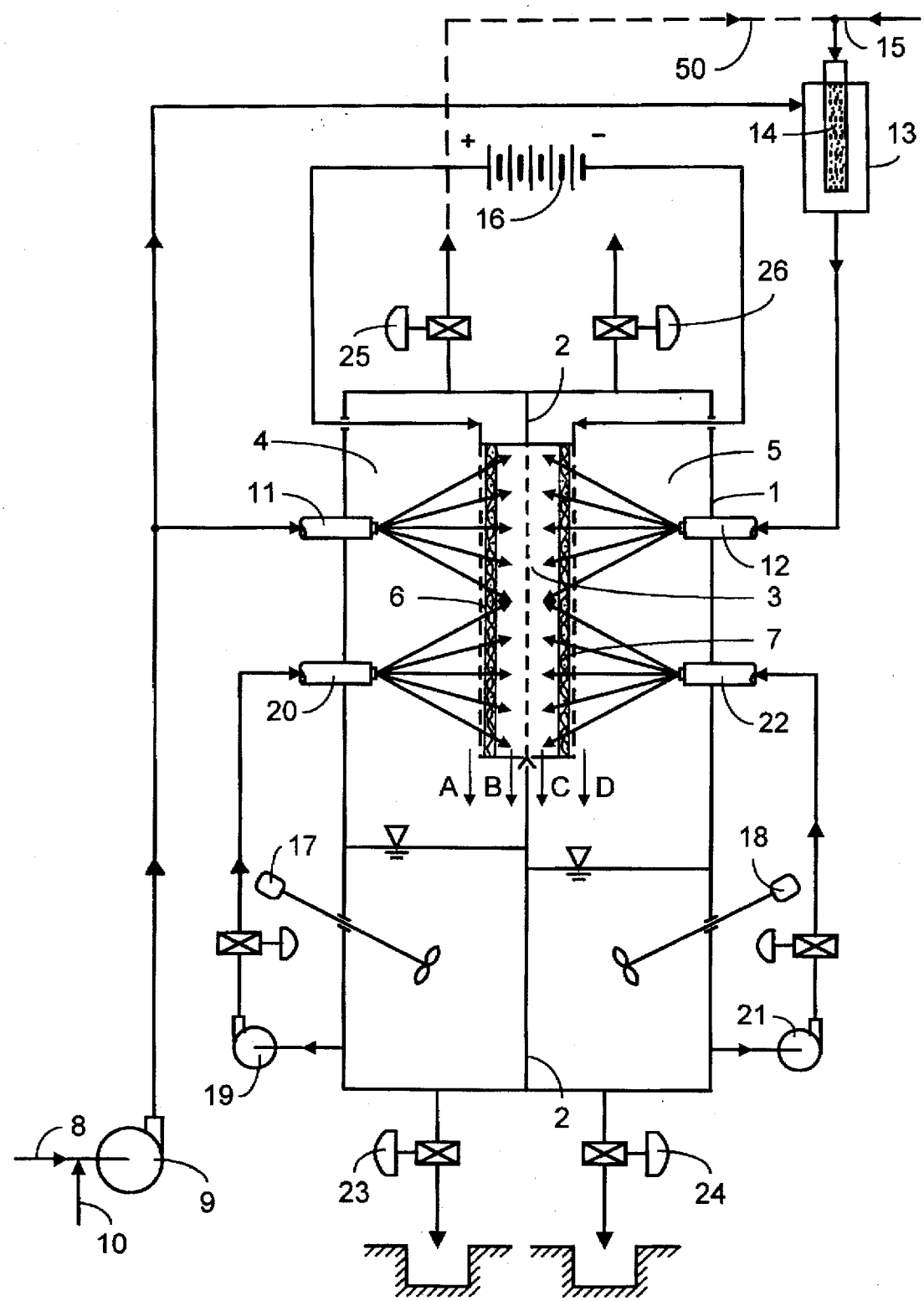
FIG. 1 shows the invented apparatus equipped with two flat electrodes and the auxiliary embodiments connected to them.

FIG. 1 shows an example of the basic principle and construction of the apparatus in a so-called flat form of construction:

A tank (1) is divided into two electrolysis chambers (4)(5) by a separation wall (2) and a diaphragm (3), where is placed respectively an anode (6) and a cathode (7).

The liquid or suspension (8) to be treated is pumped into the tank (1) by means of a pump (9), after having been added necessary chemicals (10), for example NaOH.

The electrolyte or the liquid to be treated is sprayed into the chambers through the nozzles (11) and (12) against respectively the anode (6) and cathode (7), and for the electrolyte's part, after having been added, in a separate device (13), containing a "sparger" (14), a gas (15), for example $O_2$.

The anode (6) and the cathode (7) is supplied with current from a current source (16).

The anolyte and the catholyte may after the passing through respectively anode (6) and cathode (7) be agitated and mixed by means of the agitators (17) and (18) in the lower part of the separated chambers.

A combined mixing and agitating of the electrolytes and a reinforcement of the bleaching- and oxidation effect can be achieved by letting the anolyte circulate several times in a circuit through pump (19) and nozzle (20), and for the catholyte's part through pump (21) and nozzle (22).

Finished, processed liquid or suspension is let out through valve (23) and (24), which regulate the levels in the lower part of the electrolysis chambers by means of known regulation equipment, not shown in the figure.

The gas outlet is being regulated by the valves (25) and (26), and which are regulated by known regulation equipment, not shown in the figure.

Figure 2:
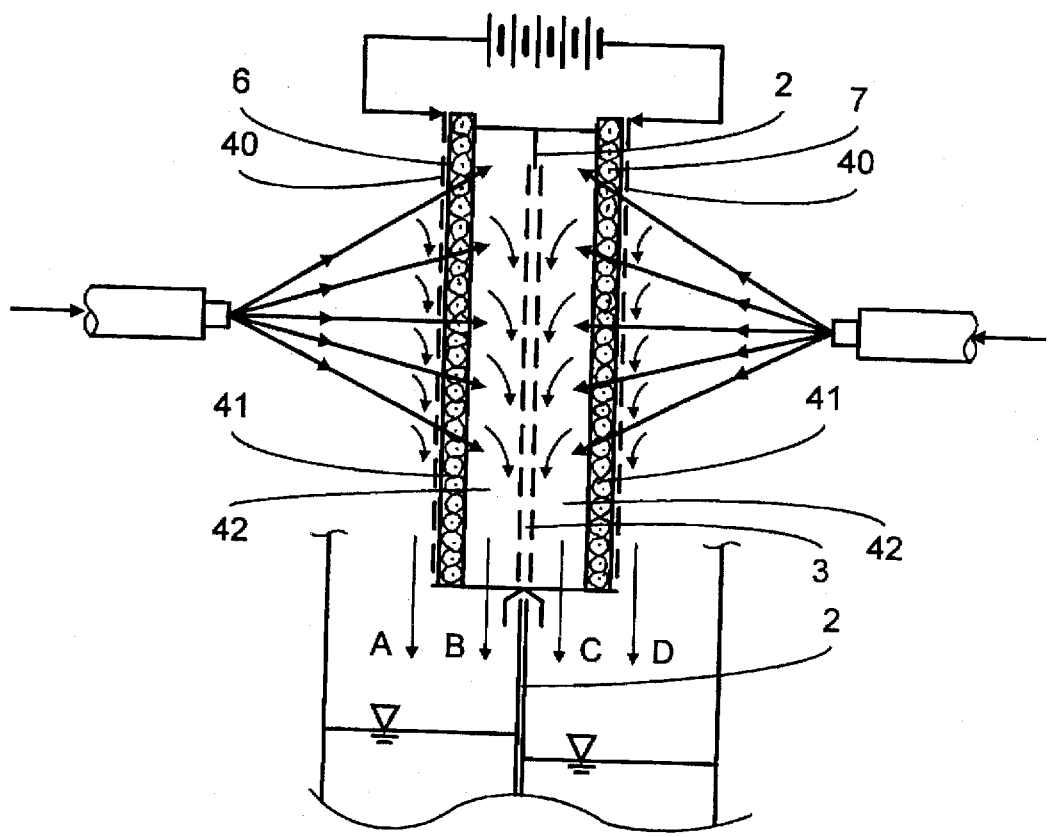
FIGS. 2 and 3 show the construction of the two flat electrodes and the diaphragm between them.
Figure 3:
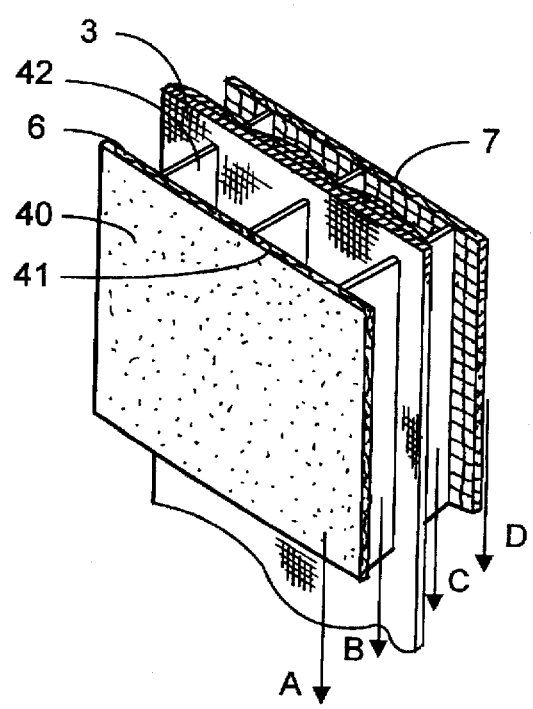

FIG. 2 and FIG. 3 show the construction of the electrodes in detail.

The anode (6) consists of a thin, perforated metal foil (40) which is attached to a coarse wire texture (41), woven by monofilament threads of an electrically insulating material, which in its turn is attached to vertical, supporting ribs (42), also made out of an insulating material, and which at the same time functions as intermediate, vertical, distance rods between the anode material (40) and the coarse wire texture (41) and the diaphragm plate (3).

The diaphragm plate (3) consists of an electrically non-conductive, but relatively dense material, for example an densely woven wire texture of monofilament threads made out of artificial materials (plastics), with mesh openings large enough to give liquid contact and passage of electrical charges between anode (6) and cathode (7), but also so dense that it stops exchange of liquid between the chambers (4) and (5) (FIG. 1).

The construction of the cathode (7) is as for the anode (6), but as seen in a mirror.

Figure 4:
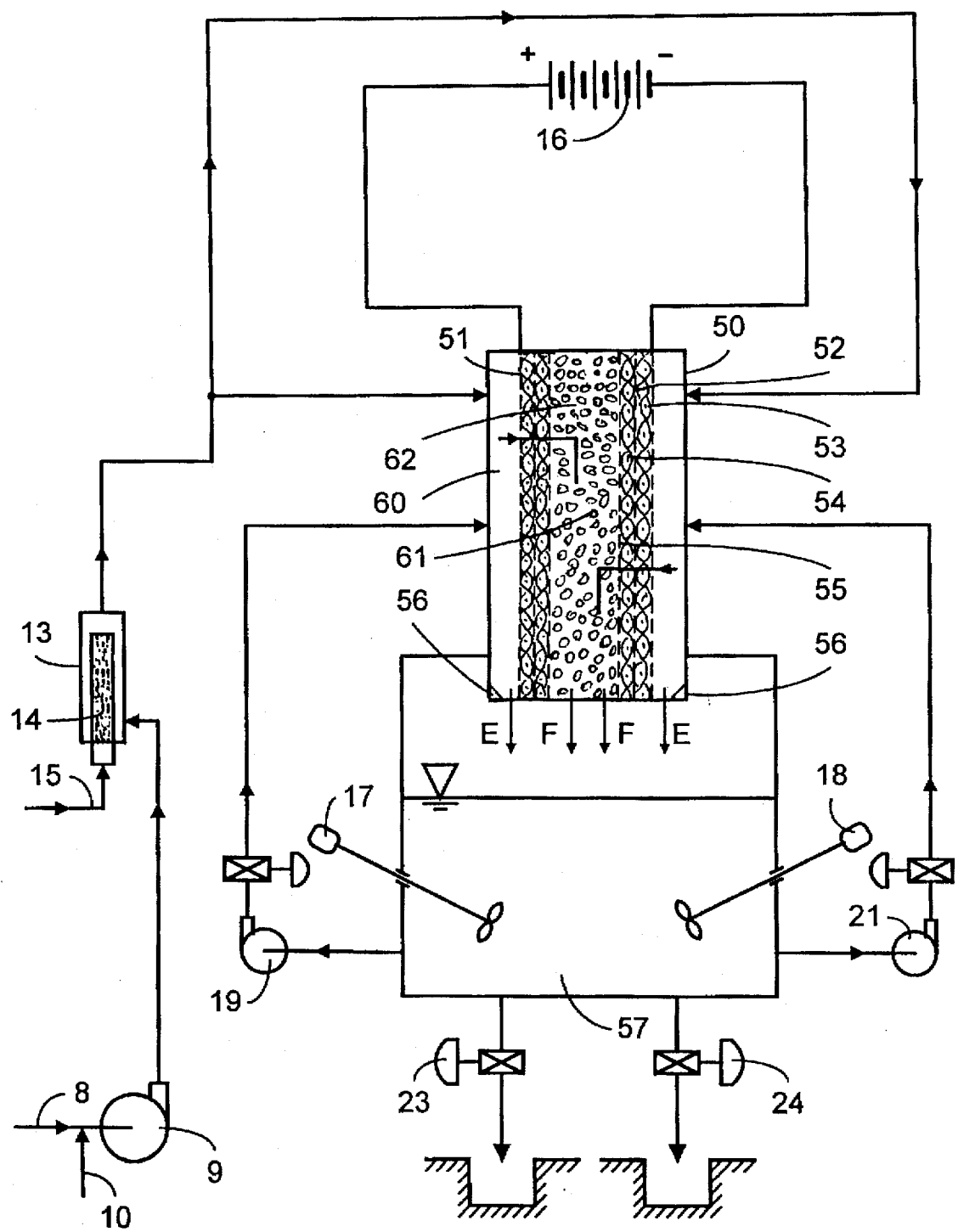
FIG. 4 shows the apparatus equipped with two cylindrically formed electrodes, together with the auxiliary embodiments.

FIG. 4 shows a round form of construction of the invention:

The electrolysis chamber (50) is formed as a tube, closed at the top and open at the lower end.

Within the tube is situated both the anode (51) and the cathode (52), both formed out of perforated metal foils like concentric tubes, the one outside the other, kept apart by a perforated and electrically insulating, tube-formed material (53), for example in the form of a coarsely woven texture of monofilament threads made out of artificial materials (plastics) or other forms of material of similar properties. The tube-formed cathode (52) rests on an insulating material (54) as described above, also formed like a tube, and which in its turn rests on an inner tube (55) of metal or an electrically insulating material, and which is equipped with relatively large holes (62) for passage of the liquid, which takes place from the outer, hollow space (60) of the electrolysis chamber towards the interior (61) of the core tube (55), whereafter the liquid streams out of the lower opening (F—F) of the core tube, into a common collection tank (57).

The part of the liquid which does not penetrate the electrodes are leaving the electrolysis chamber through the outer tube opening (E—E). A regulating choke device (56) at the lower part of the tube, only indicated and not shown in detail on the figure, regulates the liquid outlet from the outer space (60) of the tube at the lower part of the tube (E—E) and thereby also the pressure drop of the liquid between the outer room (60) of the electrolysis chamber and the inner tube core (61).

To the liquid to be treated (8) can be added gas (15) by a separate device (13) through a "sparger" (14).

FIG. 5 shows the tube-formed electrolysis chamber (50) with its inner construction of the perforated electrode material (51,52) with auxiliary, insulating intermediate layers (53,54) which all are attached to and rest against an inner, perforated core tube (55).

The liquid (8) to be treated is conducted into the outer part (60) of the electrolysis chamber through pipes, not shown in the drawing. Thereafter, the liquid passages through the first, metallic electrode (5), further through the first insulating layer (53), thereafter the second, metallic electrode (52), further through a new, intermediate insulating layer (54), and thereafter into the inner, perforated core tube (55). From there, the liquid falls out of the core tube from the opening at its lower part (F—F on FIG. 4).

FIG. 6 is a photo of an applied electrode material which shows the magnitude of the holes and form compared with cellulose fibres.

The material has a perforation equivalent to 350 mesh, i.e. 350 holes per english inch, or approximately 14 holes per mm, hole diameter approximately 30 µm, foil thickness 50 µm and open area approximately 35%.

This material exhibits approximately 200 holes per $mm^2$, i.e. 20,000 holes per $cm^2$ or 200 million holes per $m^2$.

The material has geometric design which renders it a self-cleaning when used in fibre suspensions, without clogging or filling up of the holes, for one thing because the dimension relationship between hole diameter and thickness of the material is 1:1 or 1.1,5 at the most, whereby cleaning is secured by the fibre suspension's own fast and strong movements over and through the electrode material.

THE APPARATUS' MODE OF OPERATION

With respect to FIG. 1:

The liquid or the fibre suspension which is going to be submitted to electrochemical synthesis is pumped by the pump (9) into the electrolysis chambers (4) and (5) through the nozzles (11) and (12), for the catholyte's part after addition of oxygen gas (15) in a finely dispersed form through a "sparger" (14).

The nozzles (11) and (12) spray the liquid or fibre suspension in against and partly through the perforated electrode material (40) and the underlying woven texture (41) with auxiliary supporting rods (42), and thereafter in against the partition wall (2) with the diaphragm (3), where the liquid is stopped and falls down towards the lower part of the chamber, as respectively B and C.

By electrolysis of fibre-containing suspensions, the fibres are sorted out of the suspension by the material of the electrode, and fall down as respectively A and D, while the remaining liquid is passing through respectively the anode (6) and the cathode (7).

In the anode chamber (4) the fibres A will be mixed with the liquid B, which now consists nascent oxygen, possibly by assistance from the mixing aggregate (17), in the same way as the sorted out fibres D in the cathode chamber (5) are mixed with the bleaching liquid C, containing peroxides, by means of the mixing aggregate (18).

In order to enhance the mixing- and oxidation effect further, an extra circuit of the electrolyte can be arranged in connection with the anode chamber through pump (19) and the nozzle (20), and in connection with the cathode chamber with the pump (21) and the nozzle (22).

Superfluous $O_2$ from the anode chamber (4) can be led to the cathode (7) through valve (25) and an extra inlet pipe (50) to the inlet pipe for the $O_2$ gas (15).

The mode of operation for the construction form in FIG. 4 appears from the descriptions above for FIG. 4 and FIG. 5.

When using the apparatus for electrostatic treatments, by both the flat and the round form of construction, the liquid or suspension to be treated is being sprayed or pumped through the electrolysis material as described above, whereby the liquid at the same time passes through the electrostatic field which is created between the electrodes.

Due to the minute distribution of perforation in the electrode material, the liquid which passes through it contacts a very large, electrically conducting surfaces of electrode, thus will, for the example in FIG. 6, 1 liter of liquid, when sprayed or pumped through the perforated electrode foil, contact a metal foil surface in the order of 130 $m^2$.

I claim:

1. An apparatus for carrying out an electrochemical synthesis in two or more electrolysis chambers for the production of nascent oxygen and chemical radicals to be used for delignification and/or bleaching of cellulose fibres in suspensions or oxidation of other solids suspended in liquids, or for oxidation and/or bleaching of organic compounds dissolved in liquids, for example in connection with COD-reduction in wastewater or for disinfection of liquids, carried out in-line or off-line, the apparatus comprised of electrolysis chambers equipped with special electrodes, which are built in a flat form or in a round form;

wherein the electrodes are perforated metal foils with cylindrically formed holes with diameters in the order of 10–120 µm, the foil having a thickness of the same order, the perforated metal foil has an open area between 10 and 40%, and wherein nozzles are placed adapted to pump electrolyte under pressure perpendicularly against and through the perforated metal foil, and wherein electrodes in the form of perforated, metal foils are attached to and are supported by coarse wire textures made out of monofilament, electrically insulating threads or wires, these textures having openings which are substantially larger than the holes of the metal foil, the textures having mesh counts in the order of 50 to 250, and wherein these textures are supported by another, even coarser, insulating wire texture or by rods or plates perforated with large holes, made out of metals or electrically insulating materials.

2. An apparatus as claimed in claim 1 wherein a pair of said electrodes have a flat form of construction where the electrodes are made out of flat, perforated metal foils which are arranged parallel to each other, and onto which is sprayed through nozzles from two opposite sides respectively anolyte and catholyte or the liquid to be treated, which from two sides penetrate the small holes in the two electrodes and the larger openings in the supporting texture, whereby the anolyte and catholyte or the liquid to be treated are moved in opposite direction against a common, intermediate diaphragm between the anode and the cathode, a diaphragm which, when wetted by the electrolyte, gives electrolytic contact between the electrodes, but which at the same time keeps the main parts of the anolyte and the catholyte separated from each other in two, separated circuits.

3. An apparatus as claimed in claim 1 wherein a pair of said electrodes have a round form of construction, formed as round, thin, perforated cylinders, of which the cathode cylinder is arranged concentrically outside the other and inner, anode cylinder, whereby both cylinders are kept separated from each other by an intermediate, perforated and electrically insulating wire texture, and where the inner, perforated, anode cylinder is formed around an inner core cylinder perforated with drilled holes, and kept separated from said core cylinder by an intermediate, electrically insulating wire texture, and whereby the metallic cylinder-formed electrodes, together with the inner, perforated core cylinder with the intermediate, perforated and electrically insulating intermediate layers are placed in an outer, cylinder-formed electrolysis chamber, into which liquid or suspension to be treated is being sprayed or pumped under pressure, whereafter the suspension or liquid to be treated partly streams out of the electrolysis chamber through the inner core cylinder after having penetrated the electrodes and their intermediate layers, while liquid and solids which have not penetrated the electrodes are streaming out of the outer room formed by the electrolysis chamber and the outer electrode, passing a regulating choke and outlet device which controls the pressure drop in the liquid over the electrodes and the intermediate layers between the outer room and the inner room of the core cylinder, and thereby also the quantity of the throughflow.

4. An apparatus as claimed in claim 1 wherein the coarse wire textures in the flat form of construction is supported by vertical ribs made out of an electrically insulating material, which at the same time forms vertical channels for the down-falling electrolytic liquid.

5. An apparatus as claimed is claim 1 further comprising a diaphragm material between the electrodes made out of an electrically insulating material which is dense enough to stop the jets of the electrolyte which are being sprayed against the diaphragm from both sides through respectively the anode and the cathode and the insulating textures attached to them, the diaphragm is however open enough for giving liquid contact and thereby transportation of electric charges between the electrodes but at the same time dense enough for keeping the anolyte and the catholyte separated from each other in two separate chambers and two circuits, activated by two, separate pumps.

6. An apparatus as claimed in claim 1, wherein one or more gas spargers, through which gas is injected into the catholyte before the catholyte is sprayed through the nozzle and the cathode, and which in the round form of electrode construction is injected into the liquid to be treated, and whereby anolyte and catholyte are not kept separated.

7. An apparatus as claimed in claim 1, wherein agitating and mixing devices mix nascent oxygen in the anolyte with separated fibers from the surface of the anode and wherein an agitating device mixes peroxides in the catholyte with separated fibers from the surface of the cathode.

8. An apparatus as claimed in claim 1 wherein the electrodes are built in the flat form and wherein separate circulation systems comprising pumps, nozzles and pipes circulate the electrolyte several times through the electrodes.

9. An apparatus as claimed in claim 1, wherein the flat form of electrode construction is equipped with a return pipe for excess oxygen from the anode which is conducted through valve and a pipe to an inlet pipe of an oxygen supply to the cathode.

10. The apparatus of claim 1, wherein the holes have a diameter of approximately 45 µm, an open area of 30%, and wherein the number of holes equals approximately 200 holes/mm$^2$.

11. The apparatus of claim 1, wherein the electrodes are built in the round form and wherein a circulation system circulates a mixed electrolyte through the electrodes by pumps from a common collecting tank.

* * * * *